UNITED STATES PATENT OFFICE.

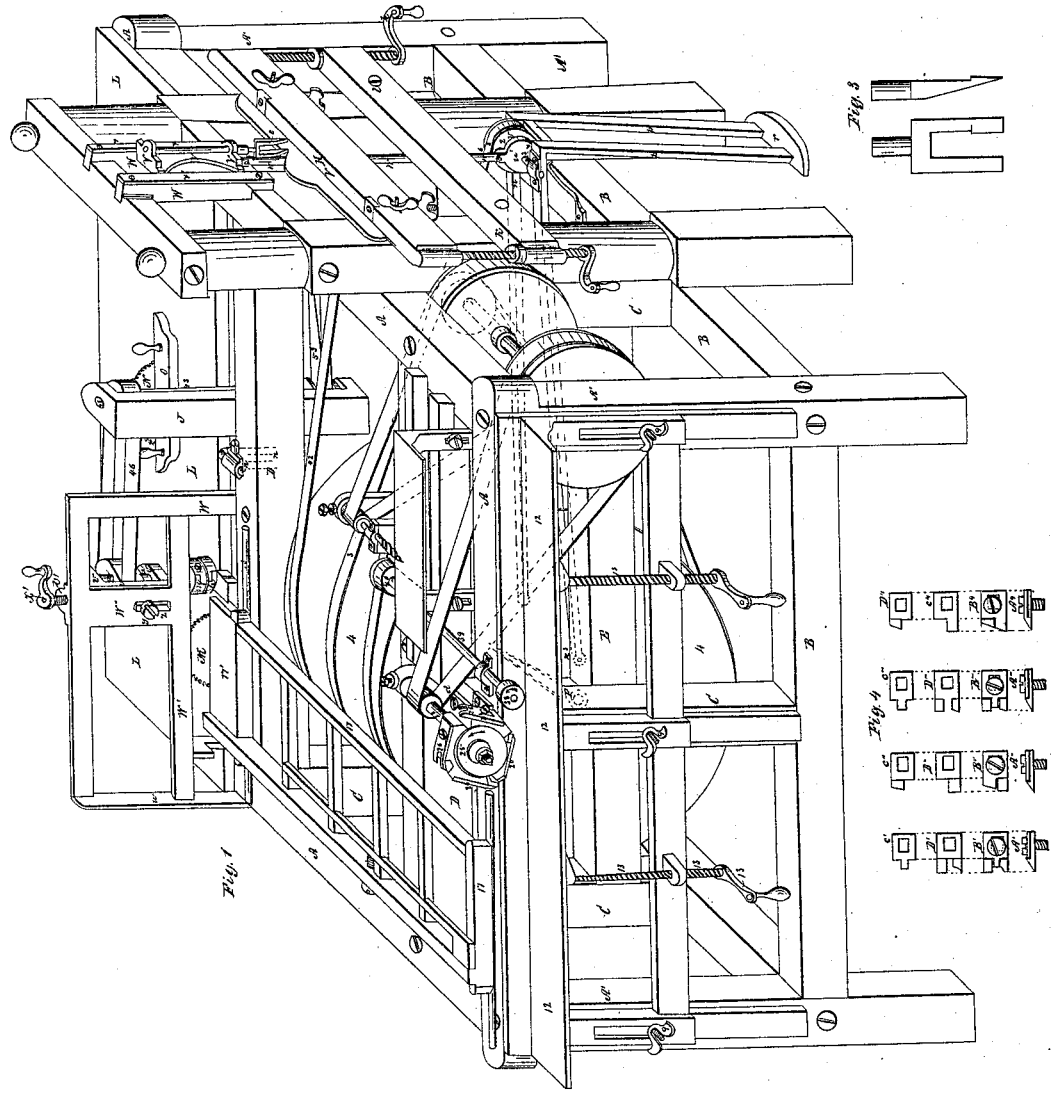
J. Leavens,
Making Sash and Blinds,
No. 5,150. Patented June 12, 1847.
Sheet 1-2 Sheets J. Learens,
Making Sash and Blinds,
N° 5,150.
Patented June 12, 1847.
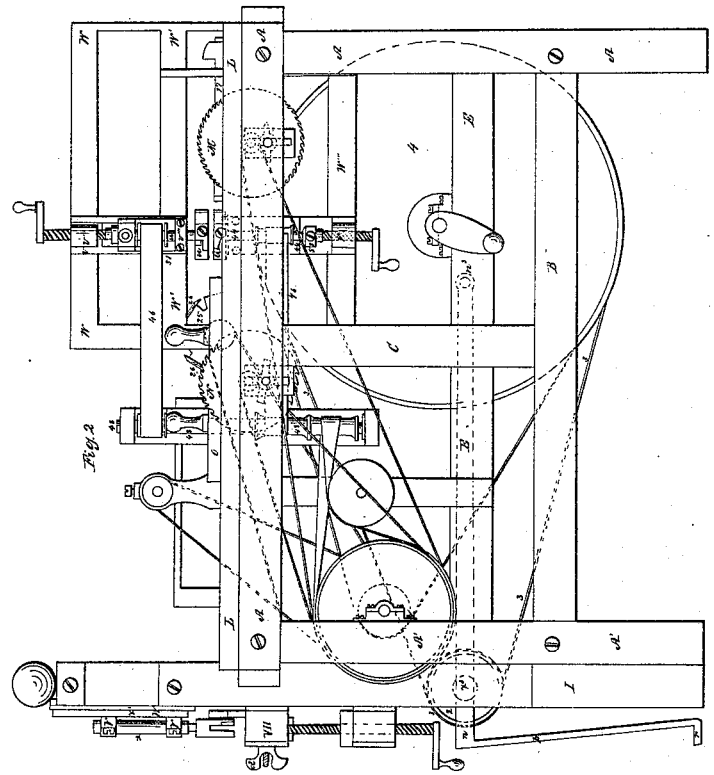

JESSE LEAVENS, OF SPRINGFIELD, MASSACHUSETTS.

SASH MACHINERY.

Specification of Letters Patent No. 5,150, dated June 12, 1847.

*To all whom it may concern:*

Be it known that I, JESSE LEAVENS, of Springfield, in the county of Hampden and State of Massachusetts, have invented new and useful Improvements in Sash Machinery, &c., and that the following is a full, clear, and exact description of the principle or character which distinguishes them from all other things before known and of the manner of making, constructing, and using the same, reference being had to the accompanying drawings, making part of this specification, in which—

Figure 1 is a perspective view of the machine; Fig. 2, a longitudinal elevation; Fig. 3, the forked chisel; and Fig. 4, details showing the molding iron or bits.

The same letters indicate parts in all the figures.

The machines heretofore made for manufacturing sash are inconvenient and expensive, and require the shaft to be frequently moved by hand for each operation. By my improvements many of the operations are combined and much greater accuracy and expedition insured.

The frame for containing the machinery is represented in Fig. 1 in perspective and is designated by the letters (A', A, B, C, D, &c.) and is of suitable size and strength to support the machinery contained therein; and its outline is nearly a curve. On the top of one side of this frame there is a plank (L) through which a circular saw (N) projects having beside it an adjustable gage (O), this saw and gage are for the purpose of slitting out the stuff—these parts are not new. The stuff is then taken to the opposite side to be planed, the apparatus for this purpose is shown in the drawing Fig. 1 on the front side and consists of the following parts: an adjustable bed piece (12), is attached to the side of the frame and regulated in its position by set screws (13), it is there permanently secured by additional screws (9); above the bed there is a square planing head (25) affixed to the end of a shaft (28) that projects over the side of the frame; on this head proper planes (26) are fastened for the purpose intended. In front of the plane there is a feed roller (38) on a long shaft (39), the outer end of which can be supported by a spring or otherwise so as to rise or fall on the stuff to be planed; this roller is driven by a pulley (40) on the opposite end of the shaft. After the stuff is planed by this apparatus it is conveyed to another side of the machine where the carriage (17) is situated; this carriage is an oblong frame on which the work can be placed and gaged to the proper length with its end projecting over the end of the carriage next the frame (W W') in front of which said carriage slides on ways.

In the frame (W, W', W'') (which projects above the frame on which the carriage slides) are the bearings ($v'$, $v''$) of a vertical shaft ($w$), see Fig. 2, on the lower end of which a revolving cutter head ($u$) is fixed. This cutter is raised or lowered to suit the work to be done by means of the bearings ($v'$, $v''$) being made adjustable on the frame (W), which frame (W) extends down below the top of the frame (A) as clearly shown at (W'''), Fig. 2, and has attached to it the bearings of a similar shaft (44) and cutter head (2) to that already described, these adjustable bearings (58) are directly opposite and on a line with the upper shaft; they are both driven by bands (46) from shaft (48)—the distance these cutter heads are placed apart is determined by the work to be done; and the shape of the planes or cutting tools, which are hereafter described, determine the style of the work. The cutter heads are of small diameter, but little exceeding the length of the tenon to be cut, which is necessary to prevent their cutting too much across the grain, as would obviously be the case were they made large; and they are placed with their shafts perpendicular to the face of the stuff to be tenoned, consequently it is necessary to have them on two separate shafts in order to cut a sufficient length of tenon and allow them to cut in great measure with the grain of the wood instead of across it the space being left clear between the cutter heads to let the tenon pass through; they are required to be placed at right angles to the stuff as above stated in order to cut under at the shoulder to form the coping, &c., which has not before been effected at one operation, thus perfecting the tenons by a single passage through the machine by the employment of cutter heads of this description the work is finished much more perfectly than in any other way, and with less power.

A circular saw (M) is placed just before the cutters in a line with the motion of the carriage (17) above named on which the stuff to be worked is placed by gage. The work placed on the carriage is then moved along with the carriage in front of the saw and cut to proper length, and is then made to pass the cutters to form the tenon with a perfect coping and franking according to the shape of the tools used on the cutter heads, by this combination of parts the stuff only requires to be once gaged and a great saving of labor is thus effected. This having never before been done forms a part of my improvement for facilitating the operation of sash making.

After leaving the carriage the stuff (which is wide enough for several bars, mountings or rails as the case may be) is taken to the saw (N) where it is slit up into strips of a proper width.

The next operation performed is mortising the stuff which is done in the mortising frame in Fig. 1. This machine has an adjustable bed (VIII) on which the piece to be mortised is laid, over which there is a grate (V) that plays up and down in fender posts (IV) on ways ($h'$), the stock ($x$) of the chisel is attached to this gate so as to revolve to turn the chisel and moves with it in these respects it is like the common mortising machine.

A rod ($w^6$) shown in Fig. 1, connects this gate with an eccentric ($u'$) on the shaft ($x^3$) which has its bearings in the double treadle lever ($n$) which has its fulcrum at ($n^3$) near the back of the frame a little below the driving drum (4) which is connected with a pulley (2) on the shaft ($H^3$) by a band (3). The two arms of the lever ($n$) that project beyond the frame turn down at right angles as at ($p$) and are joined at the bottom by a treadle ($r$) on which the foot can be placed to work the machine—by this arrangement it will be seen that when the treadle is brought down by the foot to mortise deeper, the band that drives the pulley is made tighter as the resistance increases and will always work the chisel when turned, to the depth gaged by the treadle, in the manner described; an arrangement never before employed, and in the making of sash almost indispensable to the rapid working of the stuff. It is also readily worked by manual power or by that applied to the drum (4), which is found necessary in this manufacture, while its simplicity renders it always efficient.

After being mortised the stuff is transferred to the front of the machine (see Fig. 1) and passed under the cutter head (25) above described, which has a set of suitable cutter irons (to be hereafter described) attached to it to cut the proper molding on the piece under operation, which completes the process.

The molding or cutting irons are of a proper form for the style of the sash to be made and are composed of two or more parts combined into one cutter, this is illustrated in Fig. 4. It is obvious that a flat edged chisel or cutter like that represented at (B') Fig. 4 could not be ground and sharpened without great labor if made in one piece. I therefore construct my cutters in two or more pieces to suit the nature of the case, the shanks of which overlap each other, the edges being in the same plane (see edge view A' &c., Fig. 4) so that the parts can be readily ground, sharpened, and readjusted, and the proper set given to the different parts as the work requires; other modifications of these tools are shown at (B'', B''' B$^4$) same figure, with their parts detached above and an edge view below. Irons of this construction are adapted to the cutter head (25) and also to the cutter heads ($u$) and (Q).

Having thus fully described my improvements in sash machinery, what I claim as new and desire to secure by Letters Patent, is—

1. The employment of small cutter heads placed on separate shafts at right angles to the stuff to be tenoned, which enables them to cut with the grain and also to cut under at the shoulder, and be readily adjustable the space between the cutters being left free for the tenon to pass through, as set forth, so that by passing the stuff once through, it is tenoned, coped, and franked at one operation, as above described.

2. I claim the combination of the treadle with the rotary power of a mortising machine to gage the depth to which the chisels cut and to tighten the band gradually as the chisels cut deeper so that the chisels can be gaged and driven at any elevation within the compass of the machine by the band connected with the eccentric shaft as herein set forth and at the same time can be easily worked by manual power if required.

3. I claim constructing the cutter irons in the manner set forth in two or more parts having all the cutting edges in the same plane, so that they can be readily separated and sharpened when made in the most complex figure, and then recombined in a permanent manner, as set forth.

JESSE LEAVENS.

Witnesses:
 AMOS B. LITTLE,
 J. J. GREENOUGH.